Figure 1:
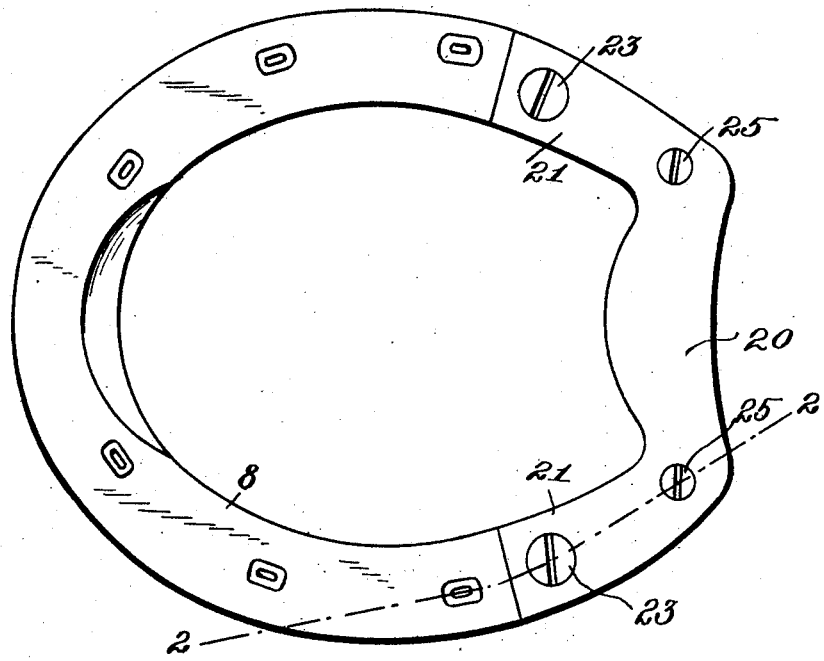

No. 826,420. PATENTED JULY 17, 1906.
F. B. GARDNER.
HORSESHOE.
APPLICATION FILED DEC. 26, 1905.

2 SHEETS—SHEET 1

Witnesses:
C. D. Kesler

Inventor
Frank B. Gardner
By James L. Norris
Atty

THE NORRIS PETERS CO., WASHINGTON, D. C.

No. 826,420. PATENTED JULY 17, 1906.
F. B. GARDNER.
HORSESHOE.
APPLICATION FILED DEC. 26, 1905.
2 SHEETS—SHEET 2.
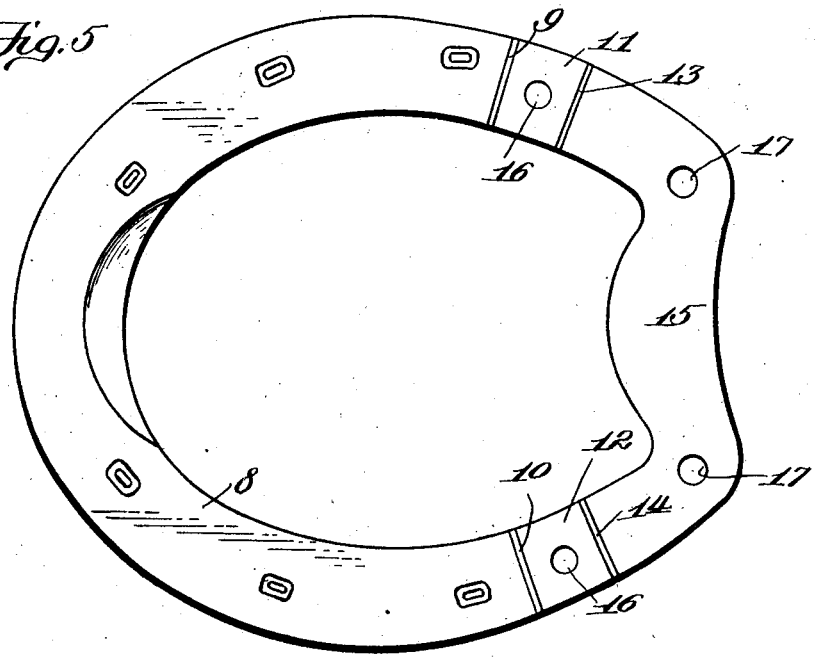
Fig. 5
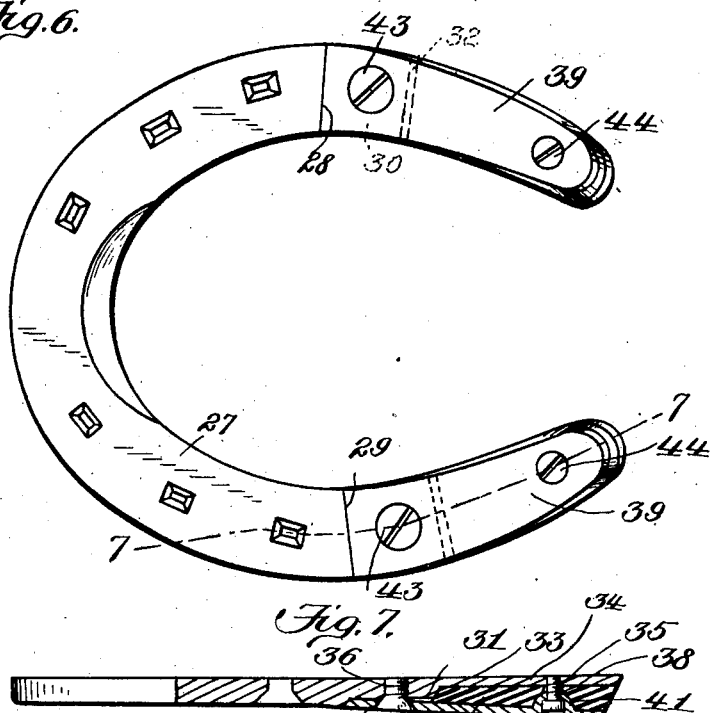
Fig. 6.
Fig. 7.
Witnesses:
G. D. Kesler
W. B. Keefer
Inventor
Frank B. Gardner
By James L. Norris
Atty

UNITED STATES PATENT OFFICE.

FRANK B. GARDNER, OF CRIDERSVILLE, OHIO, ASSIGNOR TO THE HUMANE HORSESHOE COMPANY, OF LIMA, OHIO, A CORPORATION OF OHIO.

HORSESHOE.

No. 826,420.  Specification of Letters Patent.  Patented July 17, 1906.

Application filed December 26, 1905. Serial No. 293,391.

*To all whom it may concern:*

Be it known that I, FRANK B. GARDNER, a citizen of the United States, residing at Cridersville, in the county of Auglaize and State of Ohio, have invented new and useful Improvements in Horseshoes, of which the following is a specification.

This invention relates to a construction of horseshoe devised with the object of diminishing concussion to the animal, and which consists in constructing the heel portion of the shoe in a manner as hereinafter more specifically referred to, whereby all the advantages of elasticity of tread and the consequent avoidance of concussion due to hard pavements or roads are obtained without, on one hand, the disadvantage as regards want of durability for the shoe and, on the other hand, injurious effect upon the animal's hoof.

The invention aims to provide what may be termed a "cushioned" or "elastic-heel" horseshoe which shall be simple in its construction, strong, durable, efficient in use, and comparatively inexpensive to manufacture.

With the foregoing and other objects in view the invention consists of the novel construction, combination, and arrangement of parts hereinafter more specifically described, and illustrated in the accompanying drawings, wherein is shown the preferred embodiment of the invention; but it is to be understood that changes, variations, and modifications can be resorted to which come within the scope of the claims hereunto appended.

In describing the invention in detail reference is had to the accompanying drawings, wherein like reference characters denote corresponding parts throughout the several views, and in which—

Figure 2:
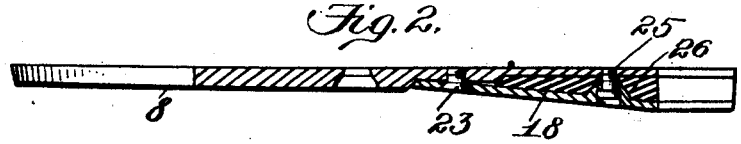
Figure 3:
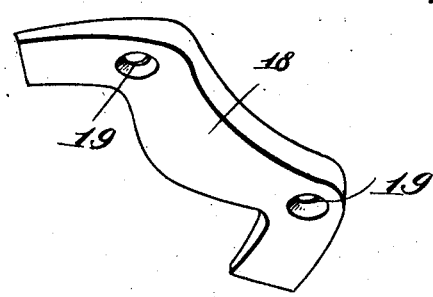
Figure 4:
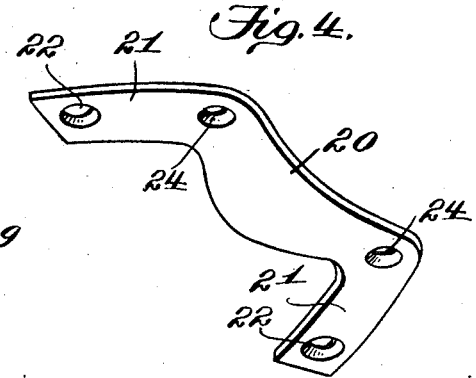

Figure 1 is a bottom plan of a horseshoe in accordance with this invention. Fig. 2 is a section on the line 2 2 of Fig. 1. Fig. 3 is a detail of the cushion. Fig. 4 is a detail of the combined heel-tread and cushion-retaining plate. Fig. 5 is a bottom plan of the shoe with the cushion and plate removed. Fig. 6 is a bottom plan of a modified form of shoe, and Fig. 7 is a section on the line 7 7 of Fig. 6.

Referring to Fig. 1 of the drawings, 8 denotes the shoe, formed of a continuous bar or stamped from one piece of material, with the tread portion of the heel cut away to form a pair of beveled shoulders 9 10, a pair of ledges 11 12, a pair of beveled shoulders 13 14, and a cushion-abutment portion 15, which is substantially U-shaped in contour and extends from the shoulder 13 to the shoulder 14. Each of the ledges 11 12 is formed with an opening 16. As shown, the walls of the openings 16 are screw-threaded, and the abutment portion 15 at the juncture of the transverse part thereof with each of the longitudinally-extending parts thereof is provided with an opening 17. As shown, the walls of the openings 17 are screw-threaded. The function of the openings 16 and 17 will be hereinafter referred to.

The reference character 18 denotes the cushion, formed of any suitable elastic or resilient material, preferably rubber, and which is of the same width and conforms in contour to the abutment portion 15, and the cushion 18 is, furthermore, so constructed as to gradually increase in thickness from its inner to its outer edge. The cushion 18 is mounted against the abutment portion 15, has the end edges thereof abut against the shoulders 13 14, and is provided with a pair of conical-shaped openings 19, which are arranged in alinement with the openings 17, and the function of said openings 19 will be hereinafter referred to.

The cushion 18 is held in position against the abutment portion 15 through the medium of a combined heel-tread and cushion-retaining spring-plate 20, which is secured to the shoe by holdfast devices in a manner as hereinafter set forth. The plate 20 conforms in contour and is of the same width as the heel portion of the shoe, has the major portion thereof bearing against the cushion 18 and the ends 21 thereof against the ledges 11 12. The end edges of the plate 20 snugly fit the shoulders 9 10, and the said end edges are slightly beveled, so that the proper fit will be had between the end edges and the shoulders 9 10. Each of the ends 21 of the plate 20 are formed with a countersunk opening 22, and the said openings 22 when the plate 20 is in position are in alinement with the openings 16, and through the openings 16 and 22 extend holdfast devices 23 for fixing the ends 21 of the plate 20 to the shoe. This securely connects the plate 20 to the shoe and prevents movement of the ends 21 of the plate. The holdfast devices when in position have the outer ends thereof flush with the outer face of the plate 20, and the said devices are shown, by way of example, as screws; but it is evident that any suitable means for the purpose set forth can be employed. The plate 20 is, furthermore, provided with a pair of openings 24, each of which is formed of two different diameters, and the said openings 24 are arranged in alinement with the openings 17, and through the openings 17 and 24 are adapted to extend the headed holdfast devices 25 for shiftably connecting the rear portion of the plate to the shoe. The holdfast devices 25 are shown, by way of example, as headed screws; but it will be evident that any suitable means for the purpose may be employed. The holdfast devices 25 are fixed at their inner ends in the openings 17 and are loosely connected to the plate 20 to enable, when occasion requires, the shifting of the rear portion of the plate. To obtain this function, said holdfast devices 25 are of a length less than the combined thickness of the portion 15, cushion 18, and plate 20. The heads of the holdfast devices play in the portions of greater diameter of the openings 24, and the body portion of the holdfast devices 25 extends through the portion of smaller diameter of the said openings 24. Consequently the plate 20 can be shifted inwardly upon the holdfast devices 25, but is connected to the shoe by the heads of said devices, as the heads of the said holdfast devices 25 act as a means for arresting the outward movement of the plate 20.

To limit the inward movement of the plate 20 to also act as a means to limit the compression of the cushion 18 and to also act as a means to prevent the cushion 18 shifting from position between the plate 20 and the portion 15, the said plate 20 is provided with a pair of inwardly-extending conical-shaped bosses 26, which surround the holdfast devices 25 and extend into the conical-shaped openings 19 of the cushion 18 and adapted to contact with the abutment 15. The extending of the bosses 26 into the openings 19 prevents the shifting of the cushion when in position. The movement of the plate 20 is limited in an inward direction when the bosses 26 contact with the abutment portion 15. The contacting of the bosses 26 with the abutment portion 15, which retards the inward movement of the plate 20, prevents further compression of the cushion 18, and it has been found that by limiting the compression of the cushion 18 it insures longevity thereto.

In the modified form shown in Figs. 6 and 7 the bar which connects one of the heels to the other of the heels and which also forms a part of the abutment portion is dispensed with, and, referring to Fig. 6 and 7, the shoe is indicated by the reference character 27, and the heel portion thereof is cut away so as to form a pair of shoulders 28 29, a pair of ledges 30 31, a pair of shoulders 32 33, and a pair of cushion-abutment portions 34, each provided with an opening 35. Each of the ledges 30 31 is also formed with an opening 36. Mounted against each of the abutment portions 34 is a cushion 37, formed of any suitable elastic or resilient material, preferably rubber, and which has its outer end formed with a conical-shaped opening 38 in alinement with the opening 35. The cushions 37 when in position are adapted to abut against the shoulders 32 33, and the said cushions 37 gradually increase in thickness from the inner to the outer edge and also conform in contour to the shape of the abutment portions 34. A pair of combined heel-tread and cushion-retaining plates are employed and which are indicated by the reference character 39. Each of the said plates 39 has its outer end formed with an opening 40 of two different diameters, said openings 40 being in alinement with the openings 35 and 38. Each of the said plates 39 is, furthermore, provided with an upwardly-extending conical-shaped boss 41, and the said bosses 41 extend in the conical-shaped openings 38. The plates 29 at their inner ends are provided with countersunk openings 42, which are in alinement with the openings 36. Holdfast devices 43 44 are employed for connecting the plates 39 to the shoe. The plates 39 are mounted upon the ledges 30 31 and abut against the shoulders 28 29. The function and construction of the openings 35, 36, 38, 40, and 42, the function and construction of the holdfast devices 43 and 44, and the function of the bosses 42 are the same as the openings 16, 17, 19, 22, and 24, the holdfast devices 23 and 25, and the bosses 26.

Owing to the manner of constructing and setting up the holdfast devices 25 or 44 it will permit of the necessary elastic action of the plates and cushions without, on the one hand, any possibility of the holdfast devices being forced upward through the cushioned abutment portions, so as to press against and injure the sole of the animal's hoof, and, on the other hand, to avoid all liability of the holdfast devices being bent or broken by contact with stones when under the effect of compression of the cushions, as the holdfast devices are caused to work in and not protrude from the openings for their reception.

The elasticity of the tread obtained by the construction of shoe in a mannner as set forth has the effect of not only diminishing concussion, but of increasing the durability of the shoe, and, furthermore, the rubber cushions beside affording elasticity in tread act also as insulators to prevent the transmission to the hoof of the heat generated by friction or acquired by contact with the hot pavements. This elastic construction of shoe is applicable not only to shoes which are open at the heel, as shown in Figs. 6 and 7, but also to what are known as "bar-shoes," as shown in Fig. 1, as well as to other special forms of shoes.

Having thus fully described my invention, what I claim as new, and desire to secure by Letters Patent, is—

1. A horseshoe having the heel portion thereof cut away to provide two pairs of shoulders, a pair of ledges and an abutment for a cushioning means, a cushioning means mounted against said abutment and a pair of said shoulders and provided with a pair of openings, a shiftable means constituting a heel-tread mounted against said ledges and cushioning means and bearing against the other pair of shoulders and provided with means extending in the said openings of the cushioning means for retaining said means in position and for limiting the movement in one direction of said tread-constituting means, means for fixing the inner portion of said tread-constituting means to the shoe, and means for shiftably connecting the outer portion of said tread-constituting means to the shoe.

2. A horseshoe having the heel portion cut away to provide a pair of shoulders, a pair of ledges and an abutment for a cushioning means, a cushioning means mounted against said abutment and against one pair of said shoulders and provided with a pair of openings, a combined heel-tread-forming and cushion-retaining means mounted against said ledges and cushion and bearing against the other pair of shoulders, holdfast devices for fixing the inner portion of said tread-forming and retaining means to said ledges, holdfast devices for shiftably connecting the outer portion of said tread-forming and retaining means to said abutment, and means carried by said tread-forming and retaining means and adapted to extend in the openings of said cushion and engage said abutment for limiting the movement in one direction of said tread-forming and retaining means.

3. A horseshoe having the heel-tread portion thereof cut away to form an abutment for a cushioning means, a cushioning means mounted against said abutment and provided with a pair of openings, a shiftable heel-tread-forming and cushion-retaining means mounted against said cushion, means for fixing the inner portion of said heel-tread-forming and retaining means to the shoe, holdfast devices for shiftably connecting the outer portion of said heel-tread-forming and retaining means to the abutment, said holdfast devices adapted to limit the movement in one direction of the outer portion of the said heel-tread-forming and retaining means, and means carried by said heel-tread-forming and retaining means and adapted to extend through the openings in the cushion and engage said abutment for limiting the movement of the outer portion of said heel-tread-forming and retaining means in the opposite direction.

In testimony whereof I have hereunto set my hand in presence of two subscribing witnesses.

FRANK B. GARDNER.

Witnesses:
J. E. GROSJEAN,
T. C. PENNELL.